United States Patent [19]
German et al.

[11] Patent Number: 5,695,589
[45] Date of Patent: Dec. 9, 1997

[54] SELF SEALING ID CARD

[75] Inventors: Michael M. German, Angola; Thomas D. Chorpenning, Hamilton, both of Ind.

[73] Assignee: Moore Business Forms, Inc., Grand Island, N.Y.

[21] Appl. No.: 560,968

[22] Filed: Nov. 20, 1995

[51] Int. Cl.$^6$ ........................................... B32B 31/00
[52] U.S. Cl. .................. 156/250; 156/249; 156/289; 156/307.1; 156/324; 283/81; 428/40.1; 428/41.4; 428/43
[58] Field of Search .................... 428/40.1, 41.4, 428/41.7, 41.8, 42.2, 42.1, 43; 156/249, 289, 324, 250, 307.1; 283/81

[56] References Cited

U.S. PATENT DOCUMENTS

| | | | |
|---|---|---|---|
| 4,986,868 | 1/1991 | Schmidt | 156/249 |
| 5,173,080 | 12/1992 | Longtin | 462/2 |
| 5,209,514 | 5/1993 | Hebert | 283/81 |
| 5,230,938 | 7/1993 | Hess et al. | 428/42 |

OTHER PUBLICATIONS

Oklahoma State Department of Health Occupational Licensing Service prior art identification card construction.

*Primary Examiner*—Nasser Ahmad
*Attorney, Agent, or Firm*—Nixon & Vanderhye P.C.

[57] ABSTRACT

An identification card intermediate is made using a press in a single pass on the press. A paper stock web (typically non-coated and non-calendered) passes through the press in a first direction, the web having a face and a back and an imaginary line extending substantially along the first direction dividing the web into first and second sides. Imaged indicia is applied to at least one of the face and back of the web on the first side, a barrier coat is applied to the second side face, and a silicone varnish (e.g. UV curable) is applied over the barrier coat and cured. A transparent plastic laminate with adhesive is applied over both the first and second sides of the web face with the adhesive engaging the face and varnish and the web is slit from the back without slitting the transparent sheet, and coincident with or after rolling, sheeting, or fan folding the web, it is removed from the press. The laminate may be a lined or linerless laminate, and appropriate perforations can be added substantially parallel to and/or perpendicular to the first direction. An ID card is then formed by detaching the ID card intermediate from the web, removing the second side of the paper stock from the laminate to expose the adhesive, and folding the laminate with exposed adhesive over the first side so that the adhesive engages and adheres to the back of the first side.

19 Claims, 2 Drawing Sheets

SELF SEALING ID CARD

BACKGROUND AND SUMMARY OF THE INVENTION

There are many circumstances in which it is desirable to provide identification cards in which a transparent sheet having adhesive engages an underlying web having a paper stock side and a release sheet side. When the release sheet is removed from the adhesive that portion of the transparent sheet may then be folded over the paper stock side and adhere to the back thereof, creating a protected identification card. One example of such a card is shown in U.S. Pat. No. 5,173,080 while other examples are in the references of record therein. In the conventional commercial manner of manufacturing such ID cards, typically two passes on a press are necessary. In the first pass a slit is provided in the liner of an over-laminate, and the text is printed on the liner if desired by the customer. The second pass provides for printing of the ID card and marrying of the ID card to the laminate.

According to the present invention a self-protecting ID card intermediate may be constructed in a manner that is simpler than the prior art described above, and can be constructed completely from paper stock without the necessity of utilizing a release liner (typically provided on the over-laminate itself). The product produced according to the invention is just as advantageous, or more advantageous, than the product produced according to the method as described above and may be readily formed into a protected identification card.

There are various aspects of the present invention. According to a first aspect a method of making an identification card intermediate using a press is provided. The method comprises the following steps, in a single pass on the press: (a) Feeding a paper stock web through the press in a first direction, the web having a face and back, and an imaginary line extending substantially along the first direction dividing the web into first and second sides. (b) Imaging at least one of the face and back of the web on the first side thereof. (c) Coating the face of the second side of the web with silicone. (d) Curing the silicone. (e) Applying a laminate including an adhesive and a transparent sheet over both the first and second sides of the web face, with the adhesive engaging the face and silicone. (f) Slitting the web from the back thereof along the imaginary line, without slitting the transparent sheet. And, (g) removing the web from the press.

Preferably steps (b) through (g) are practiced sequentially and typically there is the further step (h), after step (f) and coincident with or prior to step (g), of rolling, sheeting, or fan folding the web. There is also preferably the further step (i) before step (c) of flood coating the second side of the web with a barrier coat (which step is not necessary if the paper stock is calendered or coated) and the further step (j) of adding perforations to the face stock that are substantially parallel to and/or substantially perpendicular to the first direction. Step (j) is typically practiced after step (f) and before step (h).

Step (c) may be practiced by applying a UV curable silicone and step (d) practiced by applying UV radiation to the silicone. Step (e) may be practiced using a lined laminate, as in the prior art, and by removing the lining before over laminating; alternatively step (e) may be practiced using a rolled linerless laminate and by unrolling the laminate and then applying it directly to the web face.

According to another aspect of the invention a method of making an identification card is provided which comprises the following steps: (a1) Making an intermediate as described above. (b1) Detaching an identification card intermediate from the web. (c1) Removing the second side of the paper stock from the laminate to expose the adhesive. And, (d1) folding the laminate with exposed adhesive over the first side so that the adhesive engages and adheres to the back of the first side, forming a final ID card. Step (d1) may be practiced by detaching the intermediate from surrounding intermediates along a perforation line substantially perpendicular to the first direction.

The invention also relates to an identification card intermediate which comprises the following components: A non-coated, non-calendered paper stock base having a face and back, first and second side edges, and first and second end edges. A slit in the base substantially perpendicular to the side edges (e.g. substantially bisecting the side edges) to form first and second side portions of the base. Imaged indicia on at least one of the first side portion face and back. A barrier coat on the second side portion face. An adhesive release varnish over the barrier coat. An adhesive on the side portion face varnish and on the first side portion face base. And, a transparent plastic film covering the adhesive, the adhesive having a stronger attraction to the film than to the varnish, and the varnish a stronger attraction to the barrier coat than to the adhesive. Preferably the imaged indicia is provided on both the face and the back of the base. Tear off tractor drive strips may be provided along the first and second end edges, and a second intermediate may be connected by a perforation line to the second side edge of the base (as well as a third intermediate to the first side edge).

It is the primary object of the invention to provide for the efficient, effective, and advantageous production of desirable identification card intermediates and protected identification cards. This and other objects of the invention will become clear from an inspection of the detailed description of the invention and from the appended claims.

DETAILED DESCRIPTION OF THE DRAWINGS

Figure 1:
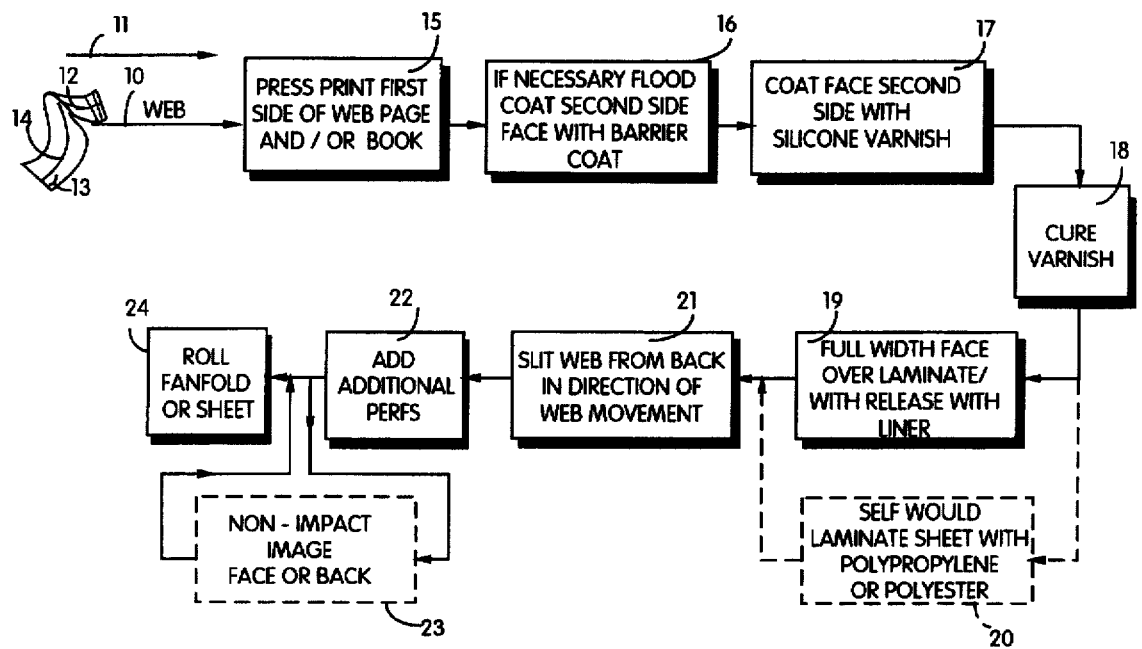
FIG. 1 is a schematic block diagram illustrating various method steps that may be practiced according to the present invention.

FIG. 1 schematically illustrates an advantageous method according to the present invention. The method provides for the production of identification card intermediates in a single pass on a press, such as a Webtron 1600, or 750 Flexopress with a laminating station. The method is practiced utilizing a paper stock web 10 which is fed in a first direction—the direction of arrow 11 in FIG. 1—in the web having a face 12 and a back 13 (the major extents of the web 10) as schematically illustrated in FIG. 1. There is also an imaginary line extending substantially along the first direction 11 dividing the web into first and second sides, as illustrated schematically by line 14 in FIG. 1.

The web 10 is imaged at a first station 15 illustrated in FIG. 1. Imaging is practiced on at least one of the face 12 and back 13, on the first side thereof, utilizing any conventional imaging technique. Particularly desirable is electrostatic (non-impact) imaging such as utilizing a MIDAX® printer such as sold by Moore Business Forms, Inc. of Lake Forest, Ill.

If the paper stock of the web 10 is not calendered or coated so as to prevent wicking of a later applied silicone coating, then as indicated at block 16 the face 12 of the second side of the web 10 is flood coated with barrier coat material. The barrier coat material prevents a porous paper substrate of the web 10 from wicking subsequently applied silicone coating. A suitable barrier coat is Duracet 122 made by Franklin International with a defoaming agent, such as Deeso 97-2 made by Ultra Additive Inc.

After application of the barrier coat at stage 16, as indicated at stage 17 the face 12 second side is coated with an adhesive release varnish, typically silicone, which is subsequently cured at stage 18. In the preferred embodiment the silicone applied at 17 is a U.V. curable silicone such as UV 9300 for easy release, 9315 for mid-range release, and 9320 for tight release, all available from General Electric Company. About 3% by weight photoinitiator (such as U.V. 9310C) is preferably mixed into the silicone.

Curing in station 18 typically is practiced using a Prime UV System model no. 210136 using type "H" bulbs. Curing is rapid when UV silicone and a UV curing stage are utilized.

After the silicone coating is cured, as indicated at stages 19 and 20, which are alternative procedures, a laminate is applied over the face 12. As indicated in box 19, the laminate—which typically is a transparent plastic film (sheet) such as of polypropylene or polyester, has an adhesive (such as an acrylic adhesive) and a release liner. One exemplary lined laminate may be Emtech Products no. FP011, a one mil thick clear polypropylene face stock with P1212 high clarity acrylic permanent adhesive and a 40 pound semi-bleached super calender liner; or Emtech Products no. FM022, a two mil thick clear polyester with P1212 adhesive and a 50 pound semi-bleached super calender liner. The release liner is removed before the adhesive is brought into contact with the face, directly into contact with the first side face, and into contact with the silicone of the second side face. However according to the invention since the laminate does not provide part of the base of the final product, a linerless over laminate (which also may be polypropylene or polyester with acrylic adhesive) may be utilized as indicated at 20 in FIG. 1, the adhesive being directly applied to the face on the press. A suitable linerless over laminate of polypropylene or polyester face stock with acrylic adhesive is available from SEKISUITA Industries, Inc.

After application of the laminate in 19 or 20, as indicated at box 21 in FIG. 1, the web 10 is slit from the back thereof along the imaginary line 14, without slitting the transparent sheet of the laminate, using conventional equipment. The slit formed (27 in FIG. 2) may substantially bisect the side edges of the stock 10. Then additional perforations may be added as illustrated schematically at 22 using conventional perforating equipment, the perforations being provided substantially parallel to the first direction 11 and/or substantially perpendicular thereto.

Where desired, additional non-impact imaging may be provided (note that the imaging in box 15 may be impact printing if desired). At optional stage 23, either the back may be printed, or by ink jet printing or the like indicia may be imaged onto the transparent sheet of the laminate.

The web of intermediate identification cards so produced is then preferably—as illustrated at box 24 in FIG. 1—rolled, fan folded, or sheeted coincident with, or just prior to, removal from the press.

Figure 2:
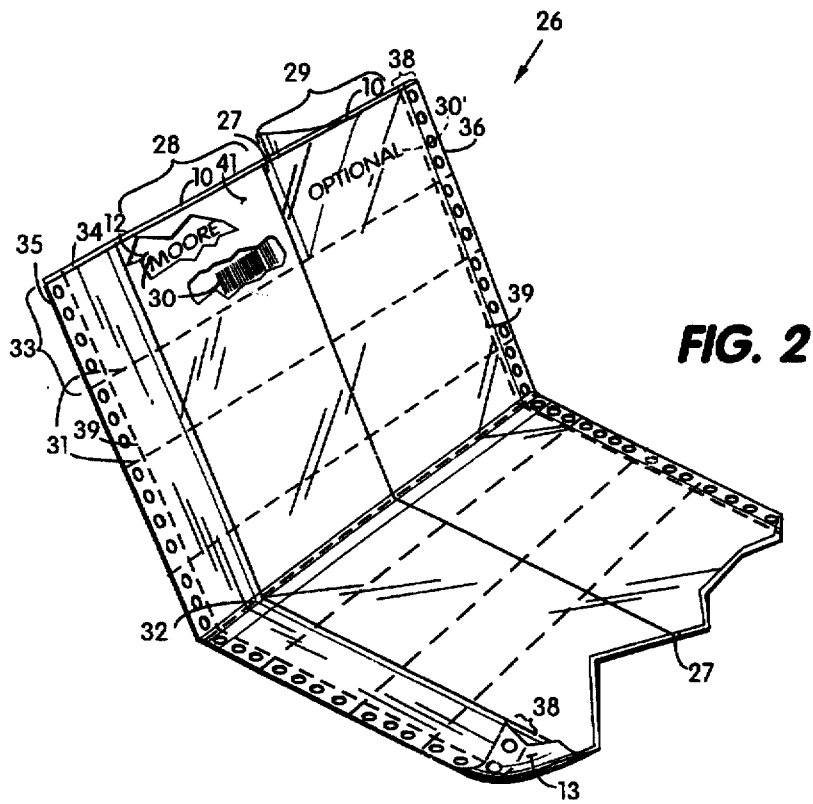
FIG. 2 is a top perspective view of a fan-folded web of identification card intermediate produced according to the method of FIG. 1.

FIG. 2 illustrates fan folded intermediate two intermediates) identification cards according to the present invention, shown generally by reference numeral 26. The web 10 has a slit 27 formed therein with a first side 28 to the left of the slit 27 as illustrated in FIG. 2 and a second side 29 to the right thereof as illustrated in FIG. 2. Indicia imaged at box 18 is shown generally by reference numeral 30, shown applied to the face 12, and in human readable form, machine readable form, or both. Of course optional indicia—indicated schematically at 30' in FIG. 2—may be applied to the face 12 of the second side 29, and other indicia may be provided to the back 13 of either of the sides 28, 29.

In FIG. 2 the fan folded intermediate 26 is shown with perforation lines 31, 32. The lines 31 separate a fan folded portion of the structure 26 into individual identification card intermediates, such as shown schematically at 33 in FIG. 2, while the perforation line 32 is provided between fan folded portions, or otherwise for separating individual identification card intermediates 33 from each other as are lo the perforation lines 31 (or like lines of weakness). Detachment along the perforation lines 31, 32 forms side edges—such as the side edge 34 in FIG. 2—of the intermediates 33, the intermediates also having end edges 35, 36.

In the embodiment illustrated in FIG. 2 for ease of production tear off tractor drive strips 38 are provided along both of the side edges 35, 36, being separated from the rest of the identification card by the perforation lines 39 which extend substantially parallel to the first direction 11 when they are produced at stage 22 (while the perforation lines 31, 32 extend perpendicular to the direction of web movement 11 when formed in stage 22). The clear plastic laminate is shown at 41 in FIG. 2, and the web paper stock at the second side 29 is shown being detached from the transparent laminate 41 at the top of FIG. 2.

Figure 3:
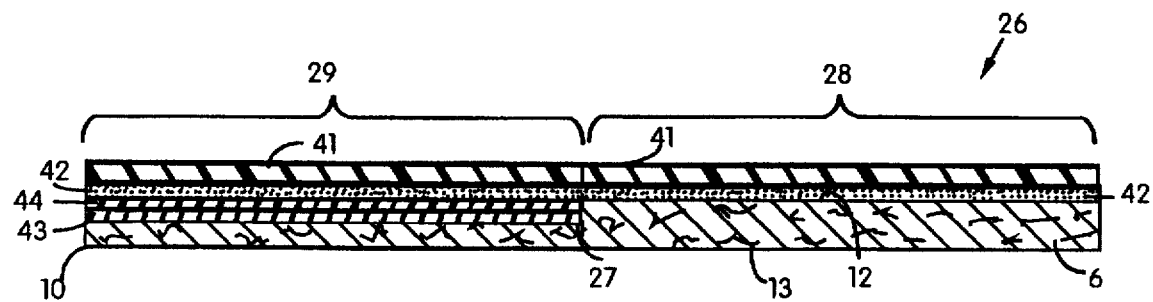
FIG. 3 is a cross-sectional view, with the size and proportions of the elements/layers greatly exaggerated for clarity of illustration, of an exemplary intermediate identification card according to the invention.

FIG. 3 illustrates the various components of the structure 26 in cross-sectional view, with the various layers greatly exaggerated in size and proportion for clarity of illustration. The bottom layer is the paper stock web 10 (which in actuality is of substantially uniform thickness) having a slit 27 formed therein to form side portions 28, 29. For first side portion 28 the adhesive 42 of the transparent sheet 41 is directly in contact with the face 12 of the paper stock 10 while for the second side portion 29 a barrier coat 43 is shown applied to the face 12, with a silicone coating 44 thereover and then the adhesive 42 and the plastic sheet 41. The barrier coat 43 is not necessary where paper stock 10 is calendered or coated so that the coating 44 will not wick into the stock 10. Non-calendered or coated paper stocks 10 are preferred, however.

Figure 4:
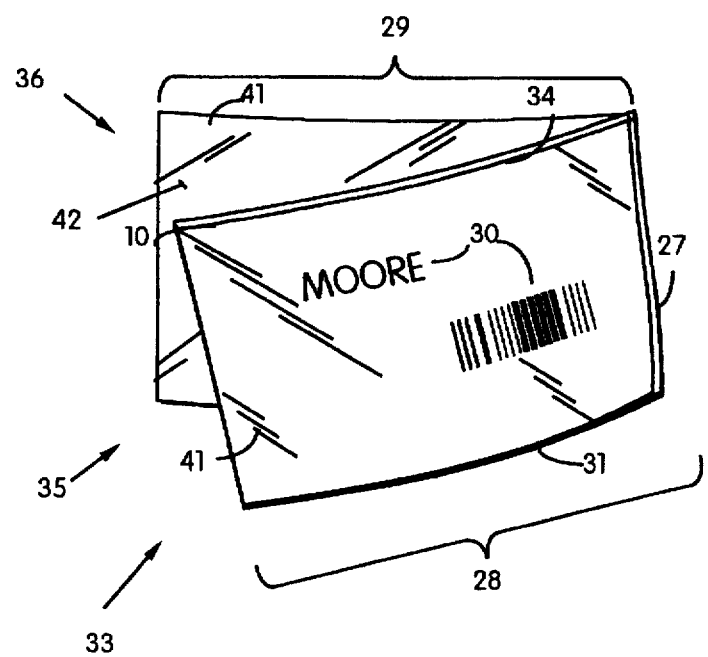
FIG. 4 is a perspective view showing the formation of the intermediate of FIG. 3 into a protected ID card.

FIG. 4 schematically illustrates a single identification card—indicated generally by reference numeral 33—that has been separated from the fan folded element 26 (by tearing along the perforation line 31, and tearing off the tractor drive strips along the perforation lines 39) after the paper stock 10, with attached barrier coat 43 and silicone coating 44, has been removed from the adhesive 42 on the second side portion 29. The adhesive 42 has greater affinity for the transparent sheet 41 than it does for the silicone coating 44, while the coating 44 has greater affinity for the barrier coat 43 or the paper stock 10 itself than it does for the adhesive 42. A second portion of the transparent sheet 41 is then folded back—along the slit line 27 so as to bring the adhesive 42 into contact with the back 13 and a final protected ID card is thus formed.

It will thus be seen that according to the present invention an advantageous method is provided for producing an identification card intermediate, as well as for making an identification card from an intermediate, as well as an advantageous identification card intermediate per se. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent processes and products.

What is claimed is:

1. A method of making an identification card intermediate using a press comprising the sequential steps of, in a single pass on the press:

(a) feeding a paper stock web through the press in a first direction, the web having a face and back, and an imaginary line extending along the first direction dividing the web into first and second sides;

(b) imaging at least one of the face and back of the web on the first side thereof;

(c) coating the face of the second side of the web with silicone varnish;

(d) curing the silicone;

(e) applying a laminate including an adhesive and a transparent sheet over both the first and second sides of the web face, with the adhesive engaging the face and silicone;

(f) slitting the web from the back thereof along the imaginary line, without slitting the transparent sheet; and (g) removing the web from the press.

2. A method as recited in claim 1 comprising the further step (h), after step (f) and coincident with or prior to step (g), of rolling, sheeting, or fan folding the web.

3. A method as recited in claim 1 wherein step (c) is practiced by applying a UV curable silicone, and wherein step (d) is practiced by applying UV radiation to the silicone.

4. A method as recited in claim 1 comprising the further step (i), before step (c), of flood coating the second side of the web with a barrier coat.

5. A method as recited in claim 2 wherein the paper stock is non-calendered and non-coated, and comprising the further step (i), before step (c), of flood coating the second side of the web with a barrier coat.

6. A method as recited in claim 1 wherein step (e) is practiced using a lined laminate, and by removing the lining before over laminating.

7. A method as recited in claim 1 wherein step (e) is practiced using a roll of linerless laminate, and by unrolling the laminate and then applying it directly to the web face.

8. A method as recited in claim 1 comprising the further step (j) of adding perforations to the face stock that are substantially parallel to and/or substantially perpendicular to the first direction.

9. A method as recited in claim 1 comprising the further step (j) of adding perforations to the face stock that are substantially parallel to and/or substantially perpendicular to the first direction; and wherein step (i) is practiced after step (f).

10. A method as recited in claim 9 comprising the further step (h), after step (j) and coincident with or prior to step (g), of rolling, sheeting, or fan folding the web.

11. A method as recited in claim 10 comprising the further step (i), before step (c), of flood coating the second side of the web with a barrier coat.

12. A method as recited in claim 9 wherein the paper stock is non-calendered and non-coated, and comprising the further step (i), before step (c), of flood coating the second side of the web with a barrier coat.

13. A method of making an identification card comprising the steps of:

(a1) making an intermediate as recited in claim 1;

(b1) detaching an identification card intermediate from the web;

(c1) removing the second side of the paper stock from the laminate to expose the adhesive; and (d1) folding the laminate with exposed adhesive over the first side so that the adhesive engages and adheres to the back of the first side, forming a final ID card.

14. A method as recited in claim 13 wherein step (a1) is practiced by the further step (j) of adding perforations to the face stock substantially parallel to and substantially perpendicular to the first direction; and wherein step (d1) is practiced by detaching the intermediate from surrounding intermediates along perforation lines substantially perpendicular to the first direction.

15. A method as recited in claim 14 wherein step (a1) is practiced by the further step (i), before step (c), of flood coating the second side of the web with a barrier coat.

16. A method as recited in claim 13 wherein step (a1) is practiced by the further step (i), before step (c), of flood coating the second side of the web with a barrier coat.

17. A method as recited in claim 3 wherein the paper stock is non-calendered and non-coated, and comprising the further step (i), before step (c), of flood coating the second side of the web with a barrier coat.

18. A method as recited in claim 1 wherein the paper stock is non-calendered and non-coated, and comprising the further step (i), before step (c), of flood coating the second side of the web with a barrier coat.

19. A method as recited in claim 1 wherein step (e) is practiced using a lined laminate, and by removing the lining before over laminating.

* * * * *